3748
Cleaveland F Dunderdale. New York City
Apparatus for Generating Illuminating Gas.
*Reissued*
Nov. 30. 1869
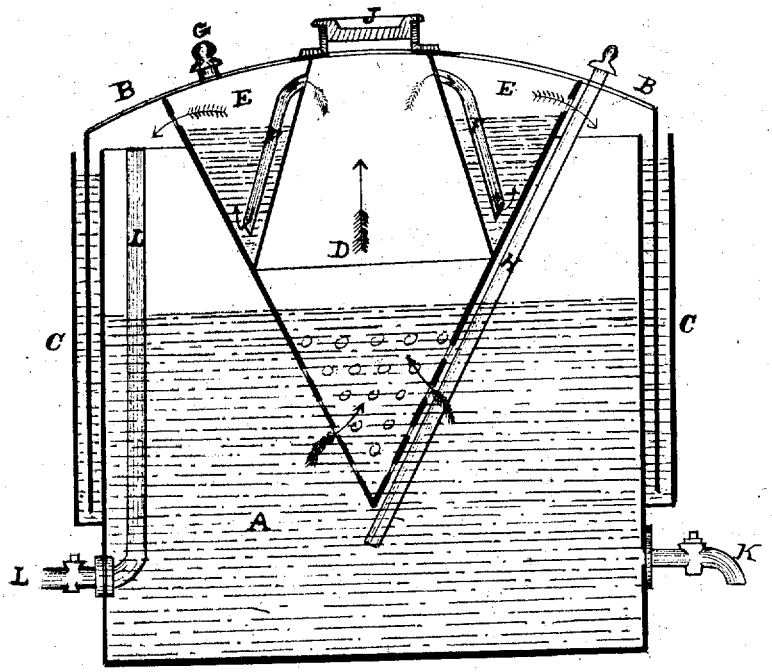
WITNESSES
J. G. Watson
Th. Eitenbenz
INVENTOR
Cleaveland F. Dunderdale

UNITED STATES PATENT OFFICE.

CLEAVELAND F. DUNDERDALE, OF NEW YORK, N. Y.

IMPROVED APPARATUS FOR GENERATING AND CARBURETING GAS.

Specification forming part of Letters Patent No. 90,644, dated June 1, 1869; reissue No. 3,748, dated November 30, 1869.

*To all whom it may concern:*

Be it known that I, CLEAVELAND F. DUNDERDALE, of New York, in the county and State of New York, have invented certain new and useful Improvements in an Apparatus for Generating Illuminating-Gas; and I do hereby declare that the following is a full and exact description of the same, reference being had to the accompanying drawing, and to the letters of reference marked thereon.

The accompanying drawing represents a vertical section of my apparatus.

The nature of my invention consists in constructing an apparatus wherein hydrogen gas can be generated and carbureted by passing it through any suitable hydrocarbon liquid, so arranged that the diluted acid, by or from which the hydrogen is generated, and the hydrocarbon liquid are separated and in different compartments, but under the same gasometer.

Apparatuses have been constructed for this purpose; but they have failed to be efficient in mixing the gases and vapors only in combining proportions and preventing the depositing of the vapors of the hydrocarbon in a liquid in the pipes, the reason being that the hydrocarbon liquid was placed in contact and floating on the top of a mixture of the acid and water, which, when the hydrogen was being generated by the contact of scraps of metal for that purpose, the reaction of the diluted acid and metal in freeing the hydrogen from the water created an excess of heat, which caused the hydrocarbon liquid to evaporate too rapidly and carry over into the pipes of the building an excess of the hydrocarbon vapors, more than the hydrogen would combine with. The diluted acid was also found to absorb part of the hydrocarbon liquid floating on its surface.

The construction and arrangement of my apparatus obviates these drawbacks and difficulties by keeping the diluted acid and hydrocarbon liquid separated in different chambers or compartments under the same cover and in one machine, but at the same time permitting and forcing the hydrogen generated therein to pass through the hydrocarbon liquid as it rises in a warm state from the contact of the metal scraps, and effecting a chemical and permanent combination or mixture, by which the hydrogen carries over only its combining proportions of the vapors of the hydrocarbon liquid. This is done in my arrangement of apparatus in a manner automatically with the generation. The combining of the gases and vapors is only done as the gas is required by consumption, or by being drawn off, thereby preventing a large collection of unused gas in the apparatus.

In the accompanying drawing one arrangement under this principle is shown by which this result can be effected, although it can be also done by other placing of the same chambers or their equivalents in the same apparatus under the same cover.

A represents the tank for containing the diluted acid and water; B, the cover of the same, for holding the gas and regulating its manufacture.

C is a tank or reservoir filled with water, surrounding the tank A, into which the bottom of the cover B is inserted, forming a seal around the lower edges of the cylinder-cover or gasholder B. To the top of this cover B a funnel-shaped cylinder, D, is securely fastened, the lower part of which is perforated with small holes *n*, and contains the iron shavings, or other suitable metal. In the upper part of this cylinder D a perfectly-tight compartment, E, is made, provided with pipes F, through which the generated hydrogen gas is conveyed from the cylinder D, under the surface of the hydrocarbon liquid contained in the chamber or compartment E. This annular chamber E, formed in the upper part of the cylinder D, which contains the hydrocarbon liquid, is filled from the pipe or opening G, closed by a suitable stopper or cock, and is provided with several holes, M, through its external walls, for allowing the gases to escape into the top cylinder or cover, B, after they have passed through the hydrocarbon liquid, and thereby have become carbureted and ready for use.

J is an opening secured by a screw-cover or its equivalent, through which the iron shavings, turnings, or other suitable metal are introduced into the cylinder D.

H is a pipe passing through the top of the cover B, and extending a little distance below the lower end of the cylinder D. This pipe is closed by a suitable stopper or cock, and is for the purpose of supplying acid or water to the tank A, and is made a little longer than the cylinder D, for the purpose of having its end always under water, being thereby sealed to prevent the escape of gas while filling the tank A.

K is a pipe, provided with a faucet, and arranged a little distance above the bottom of the tank A, for drawing off the contents of the tank, and is arranged above and clear from the bottom, to prevent it from being choked up by the crystals of the sulphate of iron or other metals which form on the bottom of the tank—the result of the reaction of the acid and the metal scraps.

L is a pipe for the exit of the gas from the gas-holder or cover B, passing through the lower part of the tank A, and extending upward within the reservoir or tank to about the level of the top thereof. To the end of this pipe, on the outside of the tank, the service-pipe for supplying the gas to the burners is connected.

The heavy shading or water lines in the drawing shows the height of the diluted acid in the tank A, and the light shading or lining the height of the hydrocarbon liquid in the compartment E when the apparatus is filled for operation.

The operation is as follows: The tank A is filled to a height as shown in the heavy lining with diluted suitable acid and the compartment E with hydrocarbon liquid to a height as shown in the light lining, while the lower part of the funnel-shaped cylinder D is filled with scrap-iron or other suitable metal the reaction of the acid upon which produces hydrogen. The operation commences by the generation of hydrogen from the diluted acid and the material in the cylinder D, which is immersed therein. This hydrogen rises into the upper part of the cylinder D and escapes into the pipes F, and is conveyed through said pipes under the surface of the hydrocarbon liquid in the reservoir or compartment E, and forcing its way through the hydrocarbon liquid combines or mixes with the vapors of this hydrocarbon liquid in its due proportions, assisted by the heat and electricity evolved in the chemical reaction between the acid-water and metals, which heat and electricity facilitate the combination of the hydrogen with the hydrocarbon vapors. The illuminating-gas thus obtained escapes through the holes M into the gasometer or cover B, from whence it makes its egress through pipe L. When the gas is manufactured faster than it is consumed its accumulation within the gasometer or cover B causes said cover B to rise, lifting thereby the funnel-shaped cylinder D, containing the metal, out of the diluted acid, and the generation of the hydrogen at once ceases, making thereby the operation of the apparatus self-regulating, according to its consumption, at the same time stopping the evaporation of the hydrocarbon liquid. The gas thus made is of an exceedingly-brilliant character, giving a light equal to the best coal-gas, with only one-third the consumption in volume.

What I claim as my invention, and desire to secure by Letters Patent, is—

1. The manufacture of carbureted hydrogen gas by placing the hydrocarbon liquid and the diluted acid in different vessels or compartments, not in contact with each other, but in the same machine and under the same cover and near each other, for the purposes described.

2. The combination and arrangement of the cover B, containing the funnel-shaped cylinder D and annular chamber E, with pipes F and outlets M, the chamber D as a regulator, conductor for the hydrogen gas, and supporter for the hydrocarbon-chamber E, the tank A, water-chamber C, and feed-pipe H, the whole being combined in the manner and for the purpose substantially as herein set forth and described.

CLEAVELAND F. DUNDERDALE.

Witnesses:
J. S. WATSON,
A. EITENBENZ.